United States Patent [19]

Molieri et al.

[11] Patent Number: 5,374,945
[45] Date of Patent: Dec. 20, 1994

[54] GRAY LEVEL PRINTING USING A THERMAL PRINTHEAD

[75] Inventors: Eduardo M. Molieri; Nancy R. Robins, both of Mesa; Lauren M. Rust, Chandler, all of Ariz.

[73] Assignee: Motorola, Inc., Schaumburg, Ill.

[21] Appl. No.: 540

[22] Filed: Jan. 4, 1993

Related U.S. Application Data

[63] Continuation of Ser. No. 731,169, Jul. 8, 1991, abandoned.

[51] Int. Cl.⁵ .............................................. B41J 2/32
[52] U.S. Cl. .............................................. 346/76 PH
[58] Field of Search ............................ 346/1.1, 76 PH

[56] References Cited

U.S. PATENT DOCUMENTS

| | | | |
|---|---|---|---|
| 4,630,068 | 12/1986 | Ims | 346/76 PH |
| 4,753,966 | 7/1988 | Brooks et al. | 364/519 |
| 4,777,536 | 10/1988 | Kato | 346/76 PH |
| 4,795,999 | 1/1989 | Takahashi et al. | 346/76 PH |
| 4,806,949 | 2/1989 | Dnuma et al. | 346/76 PH |
| 4,821,111 | 4/1989 | Nowell | 346/76 PH |
| 4,839,737 | 6/1989 | Saito | 358/257 |
| 4,894,712 | 1/1990 | Katsukawa | 346/76 PH |
| 4,951,152 | 8/1990 | Suzuki et al. | 346/76 PH |
| 4,952,949 | 8/1990 | Uebbing | 346/154 |
| 4,967,283 | 10/1990 | Ucihyama et al. | 346/76 PH |
| 4,983,994 | 1/1991 | Mori et al. | 346/76 PH |
| 4,984,092 | 1/1991 | Kato et al. | 346/76 PH |
| 5,260,715 | 11/1993 | Kishimi | 346/76 PH |

FOREIGN PATENT DOCUMENTS

| | | | |
|---|---|---|---|
| 0225697 | 6/1987 | European Pat. Off. | H04N 1/40 |
| 0245006 | 11/1987 | European Pat. Off. | B41J 3/20 |

*Primary Examiner*—Benjamin R. Fuller
*Assistant Examiner*—N. Le
*Attorney, Agent, or Firm*—Jeffrey D. Nehr

[57] ABSTRACT

A method for gray level printing using a thermal printhead which includes characterizing the paper to be printed, defining a line of a gray scale image using bitplane data sets, entering the first of the bitplane data sets into a shift register, transferring the first of the bitplane data sets from the shift register to a latch, beginning to print a section of the line of the gray scale image using the first of the bitplane data sets in the latch, entering consecutively the remaining bitplane data sets in the shift register, transferring consecutively the remaining bitplane data sets to the latch, and completing the printing of the section of the line of the gray scale image. Multiple refreshing of data per segment printing enables less than 10 millisecond line (1728 bit) printing in 16 shade gray scale.

21 Claims, 6 Drawing Sheets

GRAY LEVEL PRINTING USING A THERMAL PRINTHEAD

This application is a continuation of prior application Ser. No. 07/731,169, filed Jul. 8, 1991 now abandoned.

BACKGROUND OF THE INVENTION

This invention relates in general to the field of drive methods for use with a thermal recording apparatus, such as a printer or facsimile machine, and in particular to application of a thermal printhead to the gray scale printing process in conjunction with a high speed interface.

Current facsimiles typically print only black and white images. A dither gray scale can be obtained by printing a mosaic of black and white dots which appear to the user as a gray level (due to the integrating properties of the human eye). However, true gray scale images provide a vast improvement over the dither gray scale in that the resolution is much higher, and the information associated with the image is not destroyed by the dithering processing.

A typical thermal printhead consist of a shift register (e.g., 1728 elements long) a latch (e.g., 1728 elements long), segment drivers (e.g., four) and image resistors (e.g., 1728 resistors grouped into four segments, three of which contain 448 resistors, and one which contains 384 resistors).

There are two categories of thermal printhead, thick film, and thin film. In thick film printheads, image resistors are screened onto the head, which makes for relatively large and uneven resistors whose resistance values vary across the printhead. Relatively large resistors take longer activation times to heat sufficiently for thermal printing. When a thick film printhead is used to print a gray scale image, dark and light streaks often appear across what should be an even gray image.

A thin film printhead uses photo-lithographic processes to deposit and etch resistive material on the printhead. The thin film method creates a printhead with relatively small resistors having less variation across the printhead elements. The smaller resistors of thin film printheads take less time to heat up compared with the resistors of thick film printheads. When thin film printheads are used to print gray scales no streaking is apparent.

In order to meet military specifications and other requirements (e.g., MIL-STD-188-161A, MIL-STD-188-161B, and NATOSTANAG-5000), a facsimile must be able to support 16 grade shades printing, and be able to print one line (1728 picture elements) in 10 milliseconds. This significant time constraint includes the time required to step the paper forward in order to print the next line.

Previous methods to provide for gray scale printing have been described involving amplitude modulating the printhead voltage, using a single stylus impact head to achieve 8 levels of gray, printing one gray level at a time followed by 16 outputs, or printing one bit at a time followed by 16 outputs (the latter two examples assuming 16 gray shades). These methods, which typically vary strobing timing do not meet the 10 millisecond per line time constraint.

SUMMARY OF THE INVENTION

Accordingly, it is an advantage of the present invention to provide a new and improved method for gray level printing using a thermal printhead which provides for facsimile printing in gray shades without using dither gray techniques. It is also an advantage of the present invention to provide gray level printing using standard thick film heads or thin film heads. Additionally, it is an advantage of the present invention to provide 16 level gray printing in a 1728 bit line within a constraint of 10 milliseconds per line (including stepping to the next line). It is finally an advantage to meet U.S. military standards for 16-level gray printing in a facsimile.

To achieve these advantages, a method for gray level printing using a thermal printhead is contemplated which includes characterizing the paper to be printed, defining a line of a gray scale image using bitplane data sets, entering the first of the bitplane data sets into a shift register, transferring the first of the bitplane data sets from the shift register to a latch, beginning to print a section of the line of the gray scale image using the first of the bitplane data sets in the latch, entering consecutively the remaining bitplane data sets in the shift register, transferring consecutively the remaining bitplane data sets to the latch, and completing the printing of the section of the line of the gray scale image.

The above and other features and advantages of the present invention will be better understood from the following detailed description taken in conjunction with the accompanying drawings.

DETAILED DESCRIPTION OF THE PRIOR ART

Figure 1:
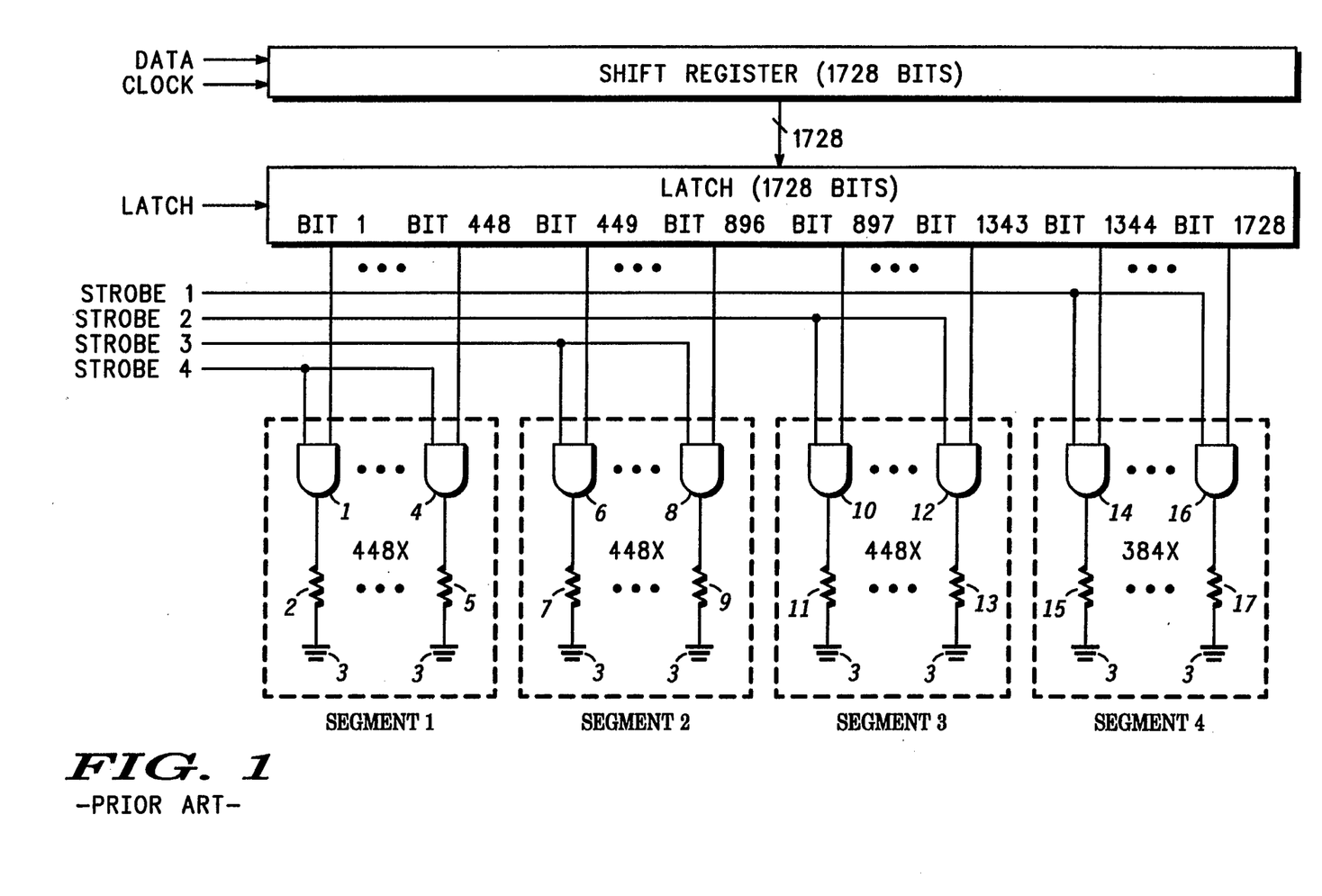
In FIG. 1 there is shown a schematic representation of a typical thermal printhead which is prior art.

FIG. 1 illustrates schematically a typical printhead which is prior art. The printhead consists of a shift register (e.g., 1728 bits) which receives clock and data inputs. Data gets shifted in and then sent over to the latch (with a capacity of the same number of bits as the shift register, e.g., 1728 bits). Four segments, to be printed separately, comprise the entire line of data. Four strobes, one per segment, enable printing to occur.

For example, for 1728 bits across the latch, the first segment can consist of 448 bits (corresponding to strobe 4), the second segment 448 bits (corresponding to strobe 3), the third segment 448 bits (corresponding to strobe 2), and the fourth segment 384 bits (corresponding to strobe 1). Each of the bits across the latch is coupled logically as one input of an AND gate; the other AND gate input is the strobe for the segment in which the bit resides.

To illustrate specifically in FIG. 1, bit 1 from the latch and strobe 4 form the inputs to AND gate 1. Similarly, bit 448 from the latch and strobe 4 form the inputs to AND gate 4. Not shown are the strobe and bit inputs for bits 2 to 447 within segment 1. The absence of the bits 2 to 447 are indicated by the ellipsis on FIG. 1 in and above the segment 1 (dashed line) block.

Also in the FIG. 1 diagram, bit 449 from the latch and strobe 3 form the inputs to AND gate 6. Bit 896 from the latch and strobe 3 form the inputs to AND gate 8. Bit 897 from the latch and strobe 2 form the inputs to AND gate 10. Bit 1343 and strobe 2 form the inputs to AND gate 12. Bit 1344 and strobe 1 form the inputs to AND gate 14. Finally, bit 1728 and strobe 1 form the inputs to AND gate 16.

Not shown in FIG. 1 are the strobe and bit inputs for bits 450 to 895 within segment 2, the strobe and bit inputs for bits 898 to 1342 within segment 3, and the strobe and bit inputs for bits 1345 to 1727 within segment 4. The absence of the bits 450 to 895, 898 to 1342, and 1345 to 1727 are indicated by the ellipses on FIG. 1 in and above the segment 2, segment 3, and segment 4 blocks, respectively.

The output of the AND gate for each bit runs through a resistive element to electrical ground. Thus, for example, the output of AND gate 1 is coupled through resistor 2 to electrical ground 3. Similarly, the outputs of AND gates 4,6,8 10,12,14, and 16 are coupled through resistors 5, 7, 9, 11, 15, and 17, respectively, to electrical ground 3.

Figure 2:
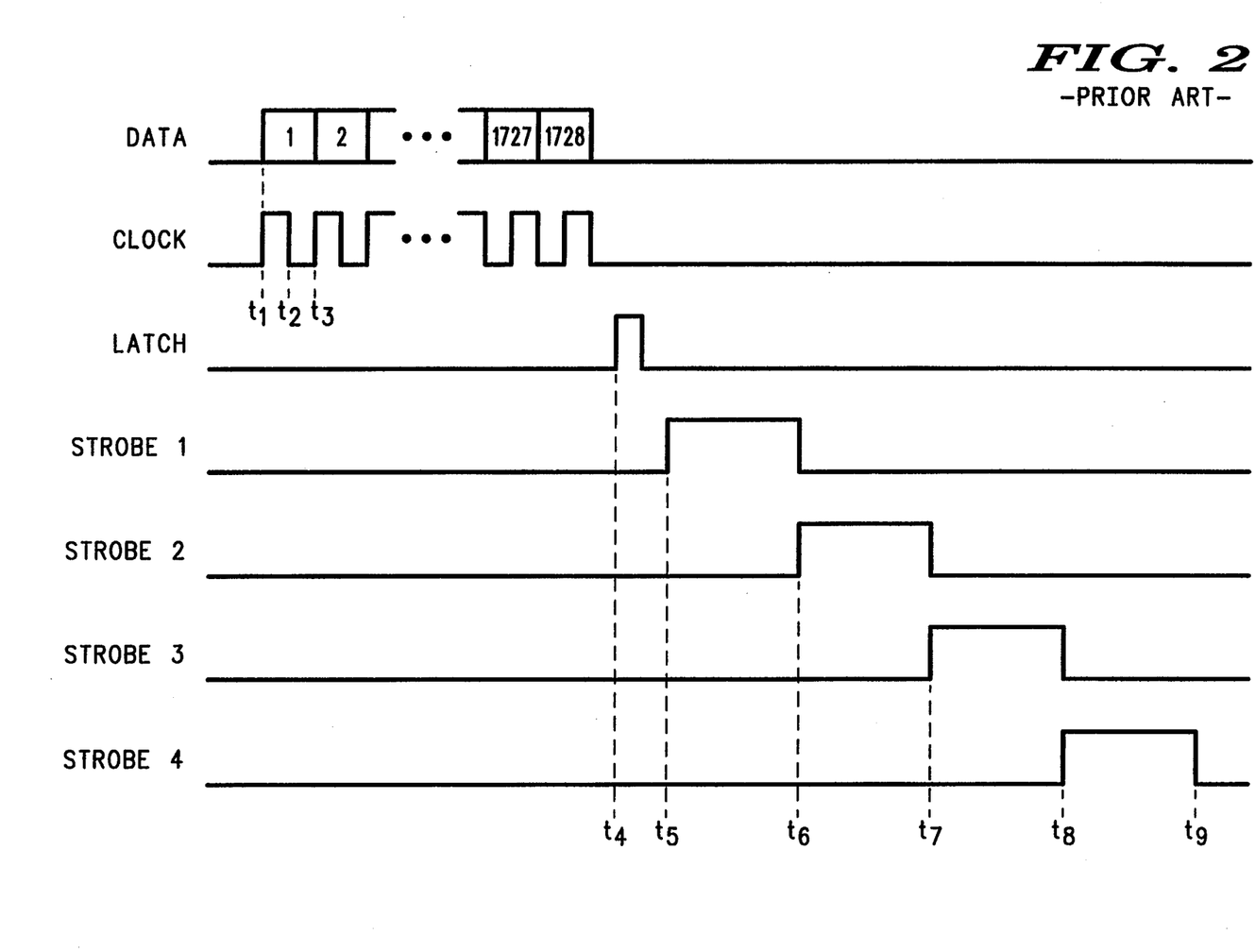
In FIG. 2 there is shown a schematic of the prior art timing characteristics of the printhead shown in FIG. 1.

As shown by the timing in FIG. 2, under normal black and white operation, the data to be printed is shifted into the shift register then transferred to the latch. FIG. 2 shows uniform clock pulses of length $t_2-t_1$, occurring at regular intervals (e.g., at $t_1$, $t_3$, etc.). Latching for one line of data (e.g., 1728 bits) begins to occur at time $t_4$. Once the data is stable in the latch, the segment drivers are enabled in turn on in a non-overlapping manner and each segment is printed sequentially. Note that the strobe inputs to AND gates 1,4,6,8,10,12,14, and 16, in FIG. 1, in conjunction with data for bit 1, bit 448, bit 449, bit 896, bit 897, bit 1343, bit 1343 and bit 1728, respectively, cause current to flow in resistors 2,5,7,9,11,15, and 17, respectively, when both the strobe and data are "on". It is current through the resistors that creates the heat to print the thermal paper. Under normal black and white operation, the strobes are turned on for a fixed amount of time to enable printing to occur. Thus, as shown in FIG. 2, strobe 1 is activated between times $t_5$ and $t_6$, strobe 2 is activated between times $t_6$ and $t_7$, strobe 3 is activated between times $t_7$ and $t_8$, and strobe 4 is activated between times $t_8$ and $t_9$.

DETAILED DESCRIPTION OF THE PREFERRED EMBODIMENT

A gray scale image can be composed of "bit planes". The most significant bitplane, plane 1, contains the most significant bit of each picture element. A second plane, plane 2, contains the second bit of each picture element (the next-to-most significant bit). A third plane, plane 3, contains the next-to-least significant bit, while a fourth plane, plane 4, contains the least significant bit. The most significant plane, plane 1, is the only bitplane used under normal black and white operation.

A preferred embodiment in accordance with the invention utilizes a standard thermal printhead to print gray scale images in a facsimile. The description assumes 16 levels of gray represented by 4 bit planes, and a 4-segment thermal printhead. The explanations, and the concepts presented can be expanded to accommodate more gray levels, or greater number of segments on the printhead.

Figure 3:
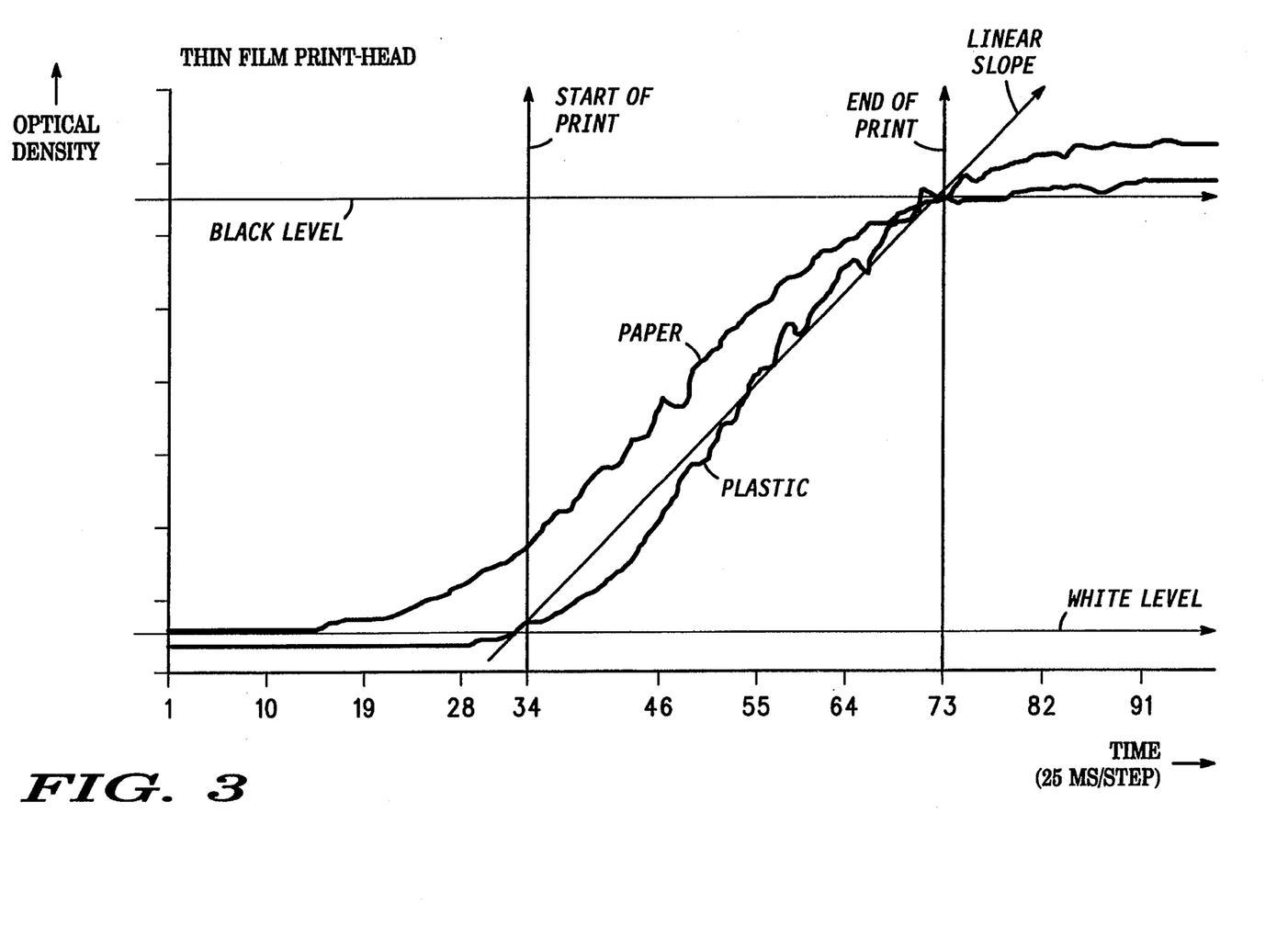
In FIG. 3 there is shown a graphical representation of the optical density of image from a thin film printhead on pulp paper and plastic paper depending on printhead activation time.

As shown in FIG. 3, the response of thermal papers, whether pulp or plastic, to thin film printhead activation is not linear. FIG. 3 shows the optical density created by a thin film printhead based on printhead activation times in steps of 25 microseconds. The performance of pulp paper and plastic thermal paper are different, as well as the performance of thick film and thin film printheads. For gray scale printing, the "on" time of the strobes can be varied and used to control the energy delivered to the image resistors. The darkening of the thermal paper can thus be made directly proportional to the energy dissipated in each print resistor.

The nonlinear response of the thermal paper shown in FIG. 3 would tend to discourage gray printing. However, if a slightly gray background is printed for a "white" level, then the thermal response of the paper can be approximated by a straight line. The deviation from a straight line approximation is greater for pulp paper than for plastic. Therefore, a better gray scale performance (more linear) is obtained for plastic paper.

While FIG. 3 shows the response of thermal papers only for thin film printheads, the characteristic shape of the response curve is essentially the same for thick film printheads, but with a different time span and slope of the linear region. The printhead configuration and paper can be characterized by experiment to determine the best performance for a particular application. Times and percentages in the explanation that follow were derived for one particular paper. Note that different values are expected to be required for different papers and that these values are used as examples only.

Printing a gray background will cause white to appear as a slight gray. For a 16 level gray image (4 bit planes), this gray background necessitates a fifth bit plane which must be printed regardless of the state of all other bit planes. This extra bit plane will be called the "bogus" bit plane, and corresponds to the strobe activation time necessary to get the printhead to the defined "white" level before printing the other 4 bit planes (e.g., 34 time "steps" at 25 microseconds per "step", or 850 microseconds) in FIG. 3, shown at the "start of print" line).

Sixteen shades of gray can be defined as shades between the "white" level, and a black level (shown at an "end of print" time of 73 time "steps" at 25 microseconds per "steps", or 1,825 milliseconds, in FIG. 3). The black level is defined to be at the point where the thermal paper saturates. Delivering energy to a print resistor beyond the saturation point will cause no visible change in the printed output.

The "on" time for each bit plane is weighted based on the significance of that bit plane. A longer "on" time produces a darker image. Therefore the more significant bit planes will stay on longer than the lesser significant planes. The bogus bit plane must typically stay on for about 46% of the print period for a thin film printhead (i.e., the 850 microseconds to the "start of print" in FIG. 3). If a thick film printhead is used, the bogus bit plane must stay on for approximately 61% of the print period. In both thin film and thick film printheads, the bogus bit plane will stay on longer than any other bit planes.

As stated earlier, in order to meet military standards of 16 levels of normalized true gray scale, a facsimile must be able to print one line (1728 picture elements) in 10 milliseconds. This limit includes the time required to step the paper forward in order to print the next line.

The time required to step the paper varies with the size of the motor used, the inertia of the paper feed mechanism, and the size of the step. For this application, the paper step requires 1.5 milliseconds. The thick film printhead has a maximum clock rate of 4 Mhz; for black, a strobe "on" time of 2.3 milliseconds is required at 5 degrees Celsius, 2.0 milliseconds at 25 degrees Celsius, and 1.8 milliseconds at 40 degrees Celsius. The thin film printhead has a maximum clock rate of 4 MHz; for black, a strobe "on" time of 2.1 milliseconds is required at 5 degrees Celsius, 1.8 milliseconds at 25 degrees Celsius, and 1.6 milliseconds at 40 degrees Celsius For both the thick film and the thin film printheads the strobe "on" times will be longer if the ambient temperature is lower (more energy is required to heat up the paper to the darkening point) and shorter if the ambient temperature is higher. The most constraining timing requirements for handling data therefore exist at the high temperature end (40 degrees Celsius). In both printheads a thermistor is provided in order for the print drive circuitry to compensate for thermal changes. When using the thick film printhead at low temperatures, the amount of time required to provide the four print strobes, and step the paper, can exceed the 10 milliseconds print time limit (e.g., 10.7 milliseconds). However, when using the thin film printhead, there is a print time margin of 0.1 milliseconds. Thus, the time constraint consideration in conjunction with better quality gray print obtained from the thin film printhead means that the thin film printhead has advantages as the preferred embodiment.

If the data clock rate is the maximum allowable (4 MHz), the time required to clock one 448 bit print segment is 112 microseconds (0.112 milliseconds), and the "on" time for the least significant bit plane (plane 4) is less than the time required to clock in the print segment. At high temperatures the "on" time for bit plane 3 (the next to least significant bit) will also be less than the time required to clock the print segment.

Figure 4:
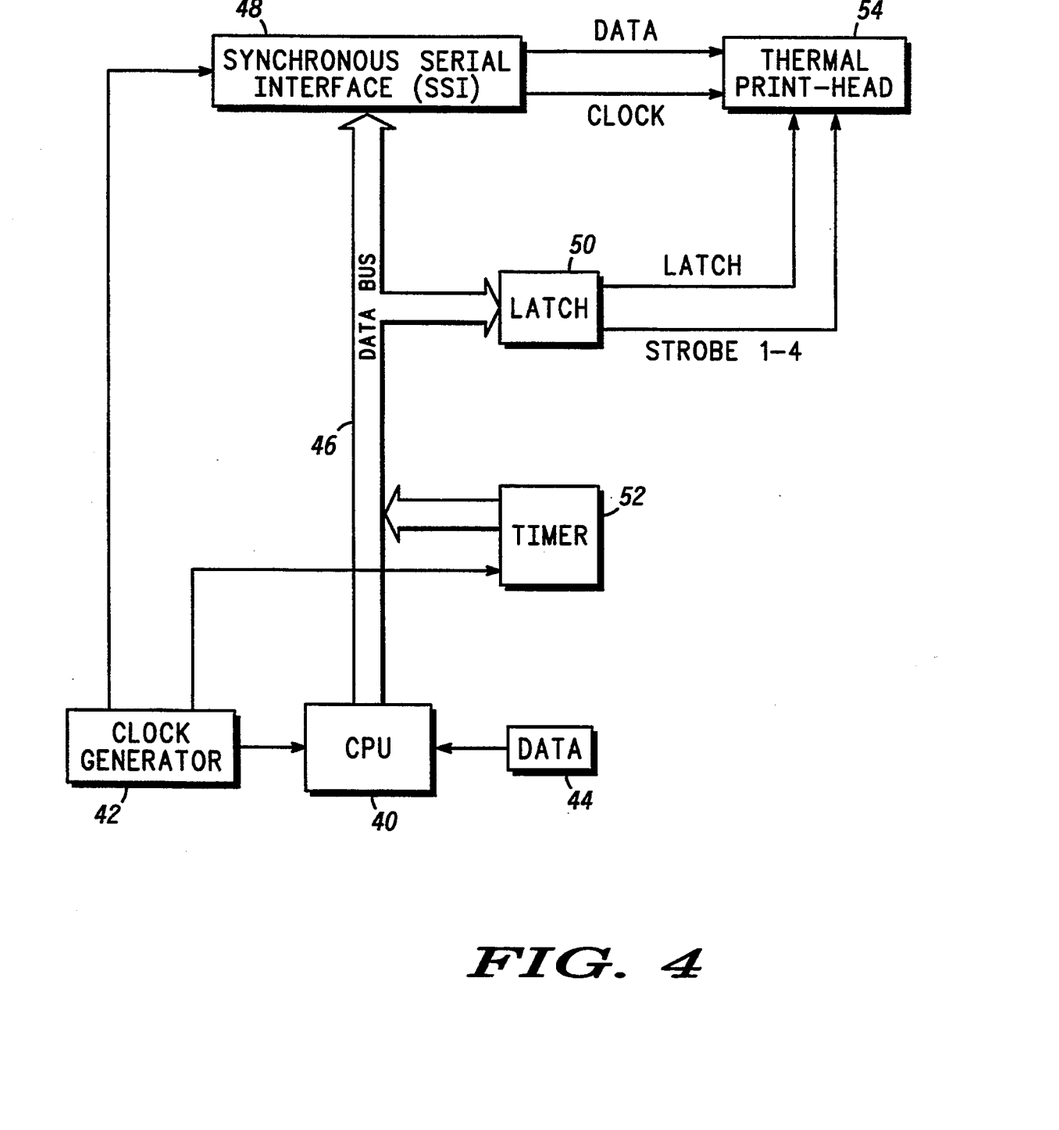
In FIG. 4 there is shown a block diagram of a system to implement a method for gray level printing using a thermal printhead in accordance with a preferred embodiment of the invention.

FIG. 4 shows a block diagram of a system to implement this method for gray level printing using a thermal printhead. A central processing unit (CPU 40, provides the overall control of the system, and is clocked by a clock generator 42. Data 44 (i.e., bitplane data) is input into the CPU 40, for processing. The data 44 is sent via a data bus 46 to a synchronous serial interface (SSI 48) and a latch 50. Control of the data transfer is via a timer 52, which receives a signal from the clock generator 42 to keep in step with the remainder of the system. Controlled by the clock generator 42, the SSI 48, which includes a shift register, provides data 44 to the thermal printhead 54 in serial fashion. The latch 50 signals the thermal printhead 54 as to when the data 44 is to be "latched," i.e. temporarily stabilized at definite values for all bits within the thermal printhead 54, so that the data 44 may be printed. The latch 50 also controls four strobes, which correspond to the four print segments within the thermal printhead 54. When enabled, the strobe for a particular segment causes that segment to print.

Figure 5:
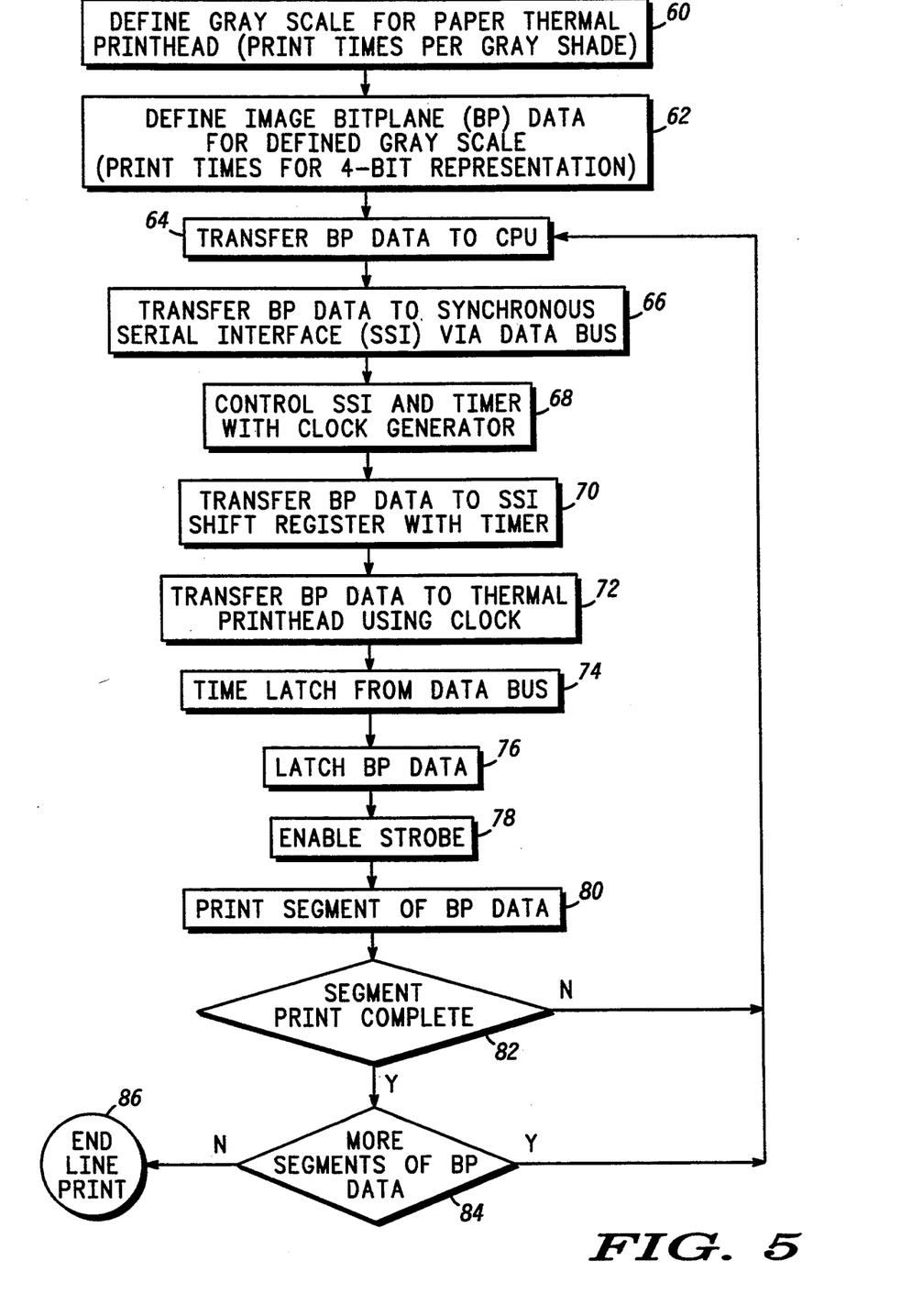
In FIG. 5 there is shown a flowchart of steps in a method for gray level printing using a thermal printhead in accordance with a preferred embodiment of the invention.

FIG. 5 lists in flowchart form the steps of the method as applied to the system in FIG. 4. First, to provide data, the gray scale definition is made (using the characterization of the family of thermal paper being used in response to the particular printhead used, as shown in block 60). The characterization results in activation times for the strobes to the thermal printheads (i.e., print times per gray shade). Second, the characterization data is correlated to a four-bit representation, defining image bitplane data sets for the defined gray scales, as illustrated in block 62. Third, the bitplane data is transferred to the CPU for processing as shown in block 64.

The bitplane data is then transferred via the data bus to the SSI, as described in block 66. The clock generator controls the SSI and timer, as illustrated in block 68, and the data is transferred in turn to the SSI shift register, as in block 70, and then to the thermal printhead, as illustrated in block 74. The bitplane data is latched, as in block 76, and then, following the enabling of the corresponding strobe corresponding to that print segment, as illustrated in block 78, the bitplane data is printed, as shown in block 80. If, as is shown in block 82, the segment print is not complete, additional bitplane data is transferred to the CPU, as shown by block 64, to be followed by the steps in successive blocks. If the segment print is complete, block 84 asks whether more segments of bitplane data remain to be printed. If so, additional bitplane data is again transferred to the CPU, as shown by block 64, to be followed by the steps in successive blocks. If all segments for the line printing are complete, that is the end of the line print, shown in block 86.

Figure 6:
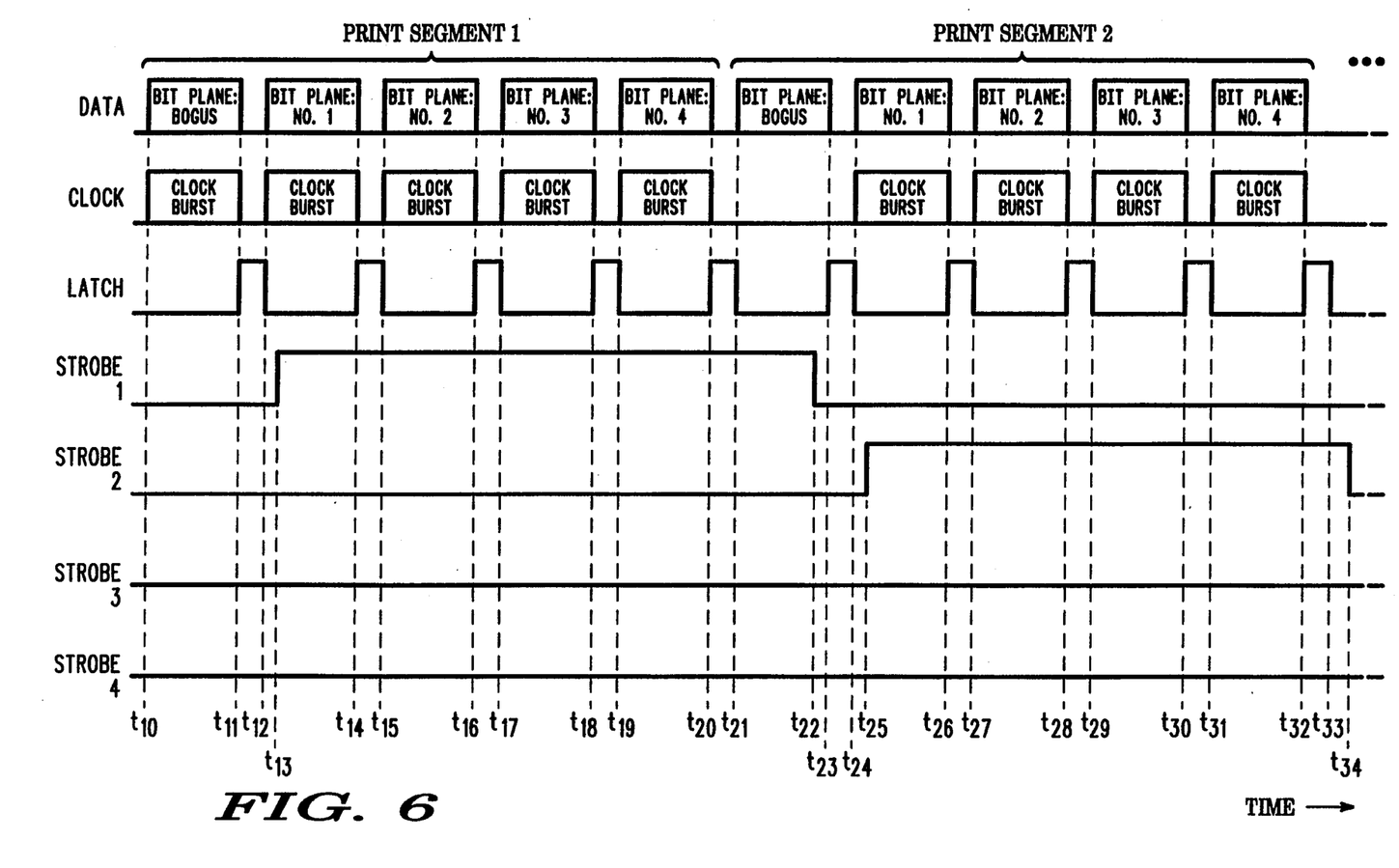
In FIG. 6 there is shown a schematic of a printhead method and timing in accordance with a preferred embodiment of the invention.

As shown in FIG. 6, a key to the method is that the bit planes are loaded in the order of the bogus bit plane, followed by bit plane 1, followed by bit plane 2, followed by bit plane 3, followed by bit plane 4. This order precludes potential timing problems, takes advantage of the "dead time" between strobes, and uses the print head shift register as a data "pipeline." A critical constraint on the load sequence is that the least significant bitplane, which has the shortest "on" time, be loaded at the end of the print sequence. The order of the other bit planes does not matter. Thus, in this case, the data for bitplane 4 is loaded at the end of the print sequence (e.g., data for bitplane 4 beginning at $t_{19}$)

FIG. 6 illustrates the method carrying through the timing sequence for the activation of the strobes to print the gray scales. Note that during the clock burst between times $t_{10}$ and $t_{11}$, data is loaded for the bogus bitplane. It is during this interval that the shift register of the print head is completely filled with data so it can be used as a "pipeline" for strobing that follows. A latch occurs between times $t_{11}$ and $t_{12}$, followed by the activation of strobe 1 to begin printing segment 1. The next clock burst and loading of bitplane 1 data occur between $t_{12}$ and $t_{14}$.

The remainder of the the printing for segment 1 proceeds as follows: First, latching of bitplane 1 data occurs between $t_{14}$ and $t_{15}$. Bitplane 2 data, loaded synchronously with the clock burst from $t_{15}$ to $t_{16}$, is latched between $t_{16}$ and $t_{17}$. Bitplane 3 data, loaded synchronously with the clock burst during $t_{17}$ to $t_{18}$, is latched between $t_{18}$ and $t_{19}$. Bitplane 4 data, loaded synchronously with the clock burst between $t_{19}$ and $t_{20}$, is latched between $t_{20}$ and $t_{21}$. Due to the "pipeline" of data, the bogus bit plane for segment 2 is already in position, so there is no clock burst required between $t_{21}$ and $t_{22}$.

Note that the printhead shift register is being used to rapidly move and update the data. All 1728 elements are transferred with each latch, but only the segment enabled is printed (other strobes are off). Essentially, five latches of bitplane updates (data corresponding to the bogus bitplane and 4 other bitplanes) occur for the printing of each segment, which allows for fast printing. The timing for the latch strobe is critical since the time elapse from the last latch update, or segment enable, determines the "on" duration of that bit plane.

The steps listed are repeated for each of the remaining segments of the printhead. The sequence for printing segment 2 is shown in FIG. 6 with timing detail, while the sequences for the printing of segments 3 and 4 are not shown because of their redundancy with the printing of segments 1 and 2. In each case, the strobe and latch timing control the "on" time of each bit plane. Thus, for printing segment 2, dock bursts and data transfers of bitplane 1 data, bitplane 2 data, bitplane 3 data, and bitplane 4 data occur from $t_{19}$ to $t_{21}$, $t_{25}$ to $t_{26}$, $t_{27}$ to $t_{28}$, $t_{29}$ to $t_{30}$, and $t_{31}$ to $t_{32}$, respectively, with corresponding latches between $t_{23}$ and $t_{24}$, $t_{26}$ and $t_{27}$, $t_{28}$ and $t_{29}$, $t_{30}$ and $t_{31}$, and $t_{32}$ and $t_{33}$. Strobe 2 is enabled from $t_{25}$, which occurs after the latching of the bogus bitplane data, to $t_{34}$, which is after the latching of the bitplane 4 data. Due to the high bit rate (e.g., close to 4 MHz) variations due to temperature and the strobe timing, a high speed processor is required to service the printhead.

Thus, a method for gray level printing using a thermal printhead has been described which overcomes specific problems and accomplishes certain advantages relative to prior art methods and mechanisms. The improvements over known technology are significant. Facsimile printing in gray shades without using dither gray techniques is possible. Gray level printing can be accomplished using standard thick film heads or thin film heads. Additionally, 16 level gray printing can be accomplished in a 1728 bit line within a constraint of 10 milliseconds per line (including stepping to the next line). Finally, U.S. military standards for 16 level gray printing with a facsimile can be met.

Thus, there has also been provided, in accordance with an embodiment of the invention, a method for gray level printing using a thermal printhead that fully satisfies the aims and advantages set forth above. While the invention has been described in conjunction with a specific embodiment, many alternatives, modifications, and variations will be apparent to those of ordinary skill in the art in light of the foregoing description. Accordingly, the invention is intended to embrace all such alternatives, modifications, and variations as fall within the spirit and broad scope of the appended claims.

What is claimed is:

1. A method for gray level printing on a paper using a thermal printhead, the method comprising the steps of:
   characterizing the paper to be printed to determine established print times for a gray scale for the paper;
   defining a line of a gray scale image in a plurality of bitplane data sets, wherein the plurality of bitplane data sets comprise a bogus bit bitplane, most significant bit bitplane, next-to-most significant bit bitplane, least significant bit bitplane, and next-to-least significant bit bitplane and a significance of each said bitplane corresponds to a printing time length;
   entering the bogus bit bitplane into a shift register;
   transferring the bogus bit bitplane from the shift register to a latch;
   beginning to print a section of the line of the gray scale image using the bogus bit bitplane in the latch and the established print times;
   entering the most significant bit bitplane, the next-to-most significant bit bitplane, the least significant bit bitplane, and the next-to-least significant bit bitplane of the plurality of bitplane data sets in the shift register, with the least significant bit bitplane entering last;
   transferring consecutively the plurality of bitplane data sets in the shift register to the latch;
   completing the printing of the section of the line of the gray scale image using the established print times.

2. A method for gray level printing using a thermal printhead as claimed in claim 1, wherein the step of characterizing the paper to be printed comprises the steps of:
   exposing the paper to a printhead that generates variable thermal activity;
   characterizing an optical opacity of the paper in response to the variable thermal activity of the printhead;
   identifying a region over which the paper responds approximately linearly to the variable thermal activity of the printhead;
   defining a "white" level as a beginning of the region;
   defining a "black" level at an end of the region; and
   determining printhead activation times corresponding to gray shades between the "white" level and the "black" level.

3. A method for gray level printing using a thermal printhead as claimed in claim 1, wherein the step of defining a line of a gray scale image comprises the steps of:
   using 1728 bits to describe the line of the gray scale image; and
   using 16 levels of gray to describe the line of the gray scale image.

4. A method for gray level printing using a thermal printhead as claimed in claim 1, wherein the step of beginning to print a section of the line of the gray scale image comprises the step of strobing a driver to deliver energy to image resistors.

5. A method for gray level printing using a thermal printhead as claimed in claim 4, wherein the steps of beginning to print a section, entering the most significant bit bitplane, transferring consecutively the plurality of bitplane data sets, and completing the printing of the section are repeated for a section comprising a first segment, second segment, third segment, and fourth segment.

6. A method for gray level printing using a thermal printhead as claimed in claim 5, wherein the steps of beginning to print a section, entering the most significant bit bitplane, transferring consecutively the plurality of bitplane data sets, and completing the printing of the section are repeated for 448 bits in the first segment, 448 bits in the second segment, 448 bits in the third segment, and 384 bits in the fourth segment.

7. A method for gray level printing using a thermal printhead as claimed in claim 5, wherein the steps of beginning to print a section, entering the most significant bit bitplane, transferring consecutively the plurality of bitplane data sets, and completing the printing of the section are repeated for the section in less than 10 milliseconds.

8. A method for gray level printing using a thermal printhead as claimed in claim 7, wherein the steps of beginning to print a section and completing the printing of the section are accomplished by a thermal printhead which is a thin film printhead.

9. A method of printing gray shades on a paper in a facsimile using a thermal printhead, the method comprising the steps of:
- characterizing the paper to be printed to determine established print times for a gray scale for the paper;
- defining a line of a gray scale image in a plurality of bitplane data sets, wherein the plurality of bitplane data sets comprise a bogus bit bitplane, most significant bit bitplane, next-to-most significant bit bitplane, least significant bit bitplane, and next-to-least significant bit bitplane and a significance of each said bitplane corresponds to a printing time length;
- entering the bogus bit bitplane into a shift register;
- transferring the bogus bit bitplane from the shift register to a latch;
- beginning to print a section of the line of the gray scale image using the bogus bit bitplane in the latch and the established print times;
- entering the most significant bit bitplane, the next-to-most significant bit bitplane, the least significant bit bitplane, and the next-to-least significant bit bitplane of the plurality of bitplane data sets in the shift register, with the least significant bit bitplane entering last;
- transferring consecutively the plurality of bitplane data sets in the shift register to the latch;
- completing the printing of the section of the line of the gray scale image using the established print tinges.

10. A method of printing gray shades using a thermal printhead as claimed in claim 9, wherein the step of characterizing the paper to be printed comprises the steps of:
- exposing the paper to a printhead that generates variable thermal activity;
- characterizing an optical opacity of the paper in response to the variable thermal activity of the printhead;
- identifying a region over which the paper responds approximately linearly to the variable thermal activity of the printhead;
- defining a "white" level as a beginning of the region;
- defining a "black" level at an end of the region; and
- determining printhead activation times corresponding to gray shades between the "white" level and the "black" level.

11. A method of printing gray shades using a thermal printhead as claimed in claim 9, wherein the step of defining a line of a gray scale image comprises the step of using 1728 bits to describe the line of the gray scale image.

12. A method for gray level printing using a thermal printhead as claimed in claim 9, wherein the step of beginning to print a section of the line of the gray scale image comprises the step of strobing a driver to deliver energy to image resistors.

13. A method for gray level printing using a thermal printhead as claimed in claim 12, wherein the steps of beginning to print a section, entering the most significant bit bitplane, transferring consecutively the plurality of bitplane data sets, and completing the printing of the section are repeated for a section comprising a first segment, second segment, third segment, and fourth segment.

14. A method for gray level printing using a thermal printhead as claimed in claim 13, wherein the steps of beginning to print a section, entering the most significant bit bitplane, transferring consecutively the plurality of bitplane data sets, and completing the printing of the section are repeated for 448 bits in the first segment, 448 bits in the second segment, 448 bits in the third segment, and 384 bits in the fourth segment.

15. A method for gray level printing using a thermal printhead as claimed in claim 13, wherein the steps of beginning to print a section, entering the most significant bit bitplane, transferring consecutively the plurality of bitplane data sets, and completing the printing of the section are repeated for the section in less than 10 milliseconds.

16. A system for gray-level printing of bitplane data comprising:
- most significant bit, second most significant bit, third most significant bit, least significant bit, and bogus bit data, wherein a significance of each said bit corresponds to a printing time, with the bogus bit data printing for the least time;
- central processing means for processing the most significant bit, the second most significant bit, the third most significant bit, the least significant bit, and the bogus bit data;
- data bus means coupled to the central processing means for transferring the most significant bit, the second most significant bit, the third most significant bit, the least significant bit, and the bogus bit data;
- clock means coupled to the central processing means and the data bus means, the clock means for controlling transfer of the most significant bit, the second most significant bit, the third most significant bit, the least significant bit, and the bogus bit data;
- synchronous serial interface means coupled to the central processing means, to the data bus means, and to the clock means, the synchronous serial interface means for providing the most significant bit, the second most significant bit, the third most significant bit, the least significant bit, and the bogus bit data;
- latch means coupled to the data bus means for stabilizing the most significant bit, the second most significant bit, the third most significant bit, the least significant bit, and the bogus bit data at definite values; and
- thermal printhead means coupled to the synchronous serial interface means and the latch means for printing the bogus bit data followed by the most significant bit, the second most significant bit, the third most significant bit, and the least significant bit data.

17. A system for gray-level printing as in claim 16 wherein the synchronous serial interface comprises shift register means for controlling the bitplane data transfer to the thermal printhead means.

18. A system for gray-level printing as in claim 16, wherein the clock means comprises timer means coupled to the data bus means, the timer means for controlling the transfer of the most significant bit, second most significant bit, third most significant bit, least significant bit, and bogus bit data to the shift register means.

19. A system for gray-level printing as claimed in claim 18 wherein the latch means comprises strobe means coupled to the thermal printhead means, the strobe means for activating the thermal printhead means in response to the most significant bit, second most significant bit, third most significant bit, least significant bit, and bogus bit data.

20. A system for gray-level printing as claimed in claim 19, wherein the thermal printhead means comprises a thin film printhead means for printing the most significant bit, second most significant bit, third most significant bit, least significant bit, and bogus bit data in a plurality of gray levels.

21. A system for gray-level printing as claimed in claim 20, wherein the plurality of gray levels comprises no more than 16 levels.

* * * * *

UNITED STATES PATENT AND TRADEMARK OFFICE
CERTIFICATE OF CORRECTION

PATENT NO. : 5,374,945
DATED : December 20, 1994
INVENTOR(S) : Eduardo Manuel Molieri et al.

It is certified that error appears in the above-indentified patent and that said Letters Patent is hereby corrected as shown below:

In column 9, claim 9, line 35, replace the word "tinges"
with --times--.

Signed and Sealed this

Twenty-sixth Day of September, 1995

Attest:

BRUCE LEHMAN

*Attesting Officer*     *Commissioner of Patents and Trademarks*